US008450015B2

(12) United States Patent
Karamanev et al.

(10) Patent No.: US 8,450,015 B2
(45) Date of Patent: May 28, 2013

(54) FUEL CELL BIOREACTOR

(75) Inventors: Dimitre Gueorguiev Karamanev, London (CA); Vassili Porfirievich Glibin, London (CA); Peter Vassilev Dobreff, London (CA)

(73) Assignee: The University of Western Ontario, London (CA)

( * ) Notice: Subject to any disclaimer, the term of this patent is extended or adjusted under 35 U.S.C. 154(b) by 842 days.

(21) Appl. No.: 12/087,009

(22) PCT Filed: Dec. 22, 2006
(Under 37 CFR 1.47)

(86) PCT No.: PCT/CA2006/002109
§ 371 (c)(1),
(2), (4) Date: Aug. 7, 2009

(87) PCT Pub. No.: WO2007/073598
PCT Pub. Date: Jul. 5, 2007

(65) Prior Publication Data
US 2009/0305083 A1 Dec. 10, 2009

Related U.S. Application Data

(60) Provisional application No. 60/753,397, filed on Dec. 27, 2005.

(51) Int. Cl.
*H01M 8/16* (2006.01)
*H01M 2/00* (2006.01)
*H01M 8/00* (2006.01)
(52) U.S. Cl.
USPC ............... 429/401; 429/421; 429/2; 429/515; 429/454; 429/503

(58) Field of Classification Search
None
See application file for complete search history.

(56) References Cited

U.S. PATENT DOCUMENTS

2006/0147763 A1* 7/2006 Angenent et al. ............. 429/2
2006/0251959 A1* 11/2006 Karamanev ................ 429/101

FOREIGN PATENT DOCUMENTS

| JP | 62256382 A2 | 11/1987 |
| KR | 3052789 A | 3/2003 |
| WO | WO 2005/001981 | 1/2005 |

OTHER PUBLICATIONS

Logan et al. "Electricity generation using an air cathode singl chamber microbial fuel cell in the presence of a proton exchange membrane", Environ. Sci.,Technol. 2004, 38, 4040-4046, Jun. 12, 2004.
Lewandowdki et al, "Microbial fuel cell using Anaerobic respiration as an Anodic reaction and biomineralized manganese as a cathodic reactant" Environ. Sci. Technol. 2005, 39 4666-4671, May 14, 2005.

* cited by examiner

*Primary Examiner* — Krishnan S Menon
(74) *Attorney, Agent, or Firm* — Hill & Schumacher

(57) ABSTRACT

The present invention discloses a fuel cell bioreactor, based on the microbial regeneration of the oxidant, ferric ions and on the cathodic reduction of ferric to ferrous ions, coupled with the microbial regeneration of ferric ions by the oxidation of ferrous ions, with fuel (such as hydrogen) oxidation on the anode. The microbial regeneration of ferric ions is achieved by iron-oxidizing microorganisms such as *Leptospirillum*. Electrical generation is coupled with the consumption of carbon dioxide from atmosphere and its transformation into microbial cells, which can be used as a single-cell protein.

44 Claims, 3 Drawing Sheets

FUEL CELL BIOREACTOR

CROSS REFERENCE TO RELATED U.S. PATENT APPLICATION

This patent application is a National Phase application claiming the benefit of PCT/CA2006/002109 filed on Dec. 22, 2006; which further claims the priority benefit from U.S. Provisional Patent Application Ser. No. 60/753,397 filed on Dec. 27, 2005, in English, which is incorporated herein by reference in its entirety.

FIELD OF THE INVENTION

The present invention relates to a fuel cell bioreactor, and more particularly the present invention relates to a bio-fuel cell based on the microbial regeneration of the oxidant, ferric ions, by the process of aerobic oxidation of ferrous to ferric ions by iron-oxidizing microorganisms such as *Leptospirillum* that eliminates carbon dioxide from the atmosphere during electricity generation.

BACKGROUND OF THE INVENTION

A major component of the development of a hydrogen economy is the wide scale adoption of fuel cell technology. While there have been significant advances towards the application of fuel cells in everyday life, their widespread use has not been achieved yet due in part to the high cost of electricity they produce, see Rose, R., Fuel Cells and Hydrogen: The Path Forward, *Report Prepared for the Senate of the USA*, http://www.fuelcellpath.org.

The slow kinetics of the oxygen reduction reaction on the cathode of the most popular proton-exchange membrane (PEM) hydrogen-oxygen fuel cell is the main reason for both the high cost of the fuel cell itself (requirement of Pt as catalyst) and of low electrical fuel efficiency, around 50% as disclosed in Bockris, J. O.-M. and R. Abdu, *J. Electroanal. Chem.*, 448, 189 (1997).

The use of redox fuel cells, in which oxygen is replaced by other oxidants, such as ferric ions, can result in the increase of the rate of cathodic reaction (or exchange current density in electrochemical terms), as disclosed in Bergens, S. H., G. B. Gorman, G. T. R. Palmore and G. M. Whitesides, *Science*, 265, 1418 (1994); Larsson, R. and B. Folkesson, *J. Appl. Electrochem.*, 20, 907 (1990); and Kummer, J. T. and D.-G. Oei, *J. Appl. Electrochem.*, 15, 619 (1985).

In addition, the rate of mass transfer of oxidant to the electrode surface (corresponding to limiting current density in electrochemical terms) is also higher, mainly because of the higher aqueous solubility of the oxidant in redox fuel cells (for example, 50 g/L for $Fe^{3+}$) as compared to that of oxygen (between 0.006 and 0.04 g/L, depending on the partial pressure and temperature). All these characteristics of the redox fuel cells should theoretically allow efficiencies for the transformation of chemical to electrical energy of 80 to 90% to be achieved using non-noble metal electrodes based on thermodyamic arguments. However, the main problem in redox fuel cells is the efficiency of reoxidation of the reduced form of the oxidant (oxidant regeneration), see Larsson, R. and B. Folkesson, *J. Appl. Electrochem.*, 20, 907 (1990); and Kummer, J. T. and D.-G. Oei, *J. Appl. Electrochem.*, 15, 619 (1985).

For example, (-ray irradiation has been used for the reoxidation of $Fe^{2+}$ to $Fe^{3+}$ in a $H_2$—$Fe^{3+}/Fe^{2+}$ redox fuel cell as disclosed in Yearger, J. F, R. J. Bennett and D. R. Allenson, *Proc. Ann. Power Sources Conf.*, 16, 39 (1962). While the efficiency of the fuel cell itself was very high, the reported efficiency of the oxidant regeneration was well below 15%. In other cases, regeneration of the oxidant is carried out using oxygen over expensive catalyst [see Bergens, S. H., G. B. Gorman, G. T. R. Palmore and G. M. Whitesides, *Science*, 265, 1418 (1994)] which eliminates the advantage of the use of non-platinum cathode, and is still slow.

Therefore, in order to develop a practically viable redox fuel cell with high overall efficiency, it is necessary to develop an efficient method for oxidant regeneration as suggested in Larsson, R. and B. Folkesson, *J. Appl. Electrochem.*, 20, 907 (1990).

The process of aerobic oxidation of ferrous to ferric ions by iron-oxidizing microorganisms such as *Acidithiobacillus ferroxidans* (*A. ferrooxidans*) was discovered more than half a century ago, see A. R. Colmer, M. E. Hinkle, Science, 106 (1947) 253-256. These microorganisms have been widely used in metallurgy for the leaching of noble (Au), heavy (U) and base (Cu, Ni, Zn, Co) metals, as well as in environmental protection. The microbial iron oxidation is based on the following net reaction:

$$4Fe^{2+}+4H^{+}+O_2=4Fe^{3+}+2H_2O \qquad (1)$$

It has been shown that the rate of microbial oxidation of ferrous ions is 10,000 times faster than that obtained by purely chemical reaction with oxygen at pH between 1 and 2, see D. T. Lacey, F. Lawson, Biotechnology and Bioengineering, 12 (1970) 29-50.

When growing on ferrous iron oxidation, *A. ferrooxidans* uses one of the narrowest thermodynamic limits known in microbial world, see W. J. Ingledew, Biochimica et Biophysica Acta, 683 (1982) 89-117. The electron transport chain of iron oxidation by this microorganism contains two half-reactions:

$$4Fe^{2+}=4Fe^{3+}+4e^{-} \qquad (2)$$

which takes place outside of the cell membrane, and $$4e^{-}+O_2+4H^{+}=2H_2O \qquad (3)$$

inside of the membrane, see M. Nemati, S. T. L. Harrison, G. S. Hansford, C. Webb, Biochemical Engineering Journal, 1 (1998) 171-190. The electrons are transported through the cell wall via a chain of three electron carriers—rusticyanin, cytochrome c and cytochrome a.

The iron-oxidizing bacteria such as *A. ferrooxidans* and *Leptospirillum ferrooxidans* are autotrophic microorganisms, i.e. they use carbon dioxide ($CO_2$), usual from atmosphere, as a sole source of carbon, while inorganic reactions such as ferrous iron oxidation (1-3) supply them with energy. The laboratory-pilot- and industrial-scale biooxidation of iron has been studied in different types of bioreactors. Under the usual cultivation conditions in a bioreactor containing *L. ferrooxidans* grown on ferrous ions, the redox potential can reach a value of 1000 mV, see M. Boon, K. C. A. M. Luyben, J. J. Heijnen, Hydrometallurgy, 48 (1998) 1-26. Since the potential of reaction (3) is 1230 mV vs. standard hydrogen electrode (SHE), up to approx. 81% of the reaction energy is used for the production of $Fe^{3+}$, while the rest (~19%) is available to microorganisms for biomass formation and maintenance.

The biooxidation of ferrous iron by *A. ferrooxidans* has been used in electrochemical cells for several different purposes. In all these cases, the electrochemical reaction, taking place on the surface of the cathode is:

$$Fe^{3+}+e^{-}=Fe^{2+} \qquad (4)$$

Several different counter-electrode (anode) reactions have been described:

A) Oxygen Formation According to the Reaction:

$$2H_2O = 4e^- + O_2 + 4H^+ \tag{5a}$$

In that case, it is necessary to apply external electrical potential in order to reduce the ferric iron on one electrode and to produce oxygen on the other. This system has been used for the continuous regeneration of the microbial substrate (ferrous iron) which resulted in the production of very high cell yields, see N. Matsumoto, S, Nakasono, N. Ohmura, H. Saiki, Biotechnology and Bioengineering, 64 (1999) 716-721; and S. B. Yunker, J. M. Radovich, Biotechnology and Bioengineering, 28 (1986) 1867-1875.

B) Oxidation of Ferric Ions:

$$Fe^{2+} = Fe^{3+} + e^- \tag{5b}$$

This type of electrobioreactor has been used to determine the rate of microbial ferrous iron oxidation by measuring the value of the electrical current, see H. P. Bennetto, D. K. Ewart, A. M. Nobar, I. Sanderson, Charge Field Eff. Biosyst.-2, [Proc. Int. Symp.], (1989) 339-349; and K. Kobayashi, K. Ibi, T. Sawada, Bioelectrochemistry and Bioenergetics, 39 (1996) 83-88.

C) Oxidation of Organic Compounds such as Methanol:

$$CH_3OH + H_2O = CO_2 + 6H^+ + 6e^- \tag{5c}$$

This system has been used for the electrochemical degradation of pollutants (methanol) in water, see A. Lopez-Lopez, E. Exposito, J. Anton, F. Rodriguez-Valera, A. Aldaz, Biotechnology and Bioengineering, 63 (1999) 79-86.

No literature data has been found describing a fuel cell for the production of electricity, based on the cathodic reduction of ferric to ferrous ions, coupled with the microbial regeneration of ferric ions by the oxidation of ferrous ions and coupled with the oxidation of hydrogen with the exception of Applicant's earlier WO 2005/001981 A2 discussed hereinafter. The above analysis of the energetics of ferrous iron oxidation by *A. ferrooxidans* shows that up to 81% of the Gibbs energy of microbial oxygen reduction can be used for the iron oxidation, i.e. production of electricity, while the rest will be consumed by the microorganisms for maintenance and formation of new cell biomass. It has also been found that the growth of *A. ferrooxidans* can be uncoupled from iron oxidation under certain conditions, see M. Nemati, S. T. L. Harrison, G. S. Hansford, C. Webb, Biochemical Engineering Journal, 1 (1998)171-190, i.e. these microorganisms can oxidize ferrous iron under zero-growth conditions.

It has been recognize that the global warming, caused mainly by anthropogenic carbon dioxide emissions, is one of the main problems which humanity faces at the moment. Presently, the most promising way to reduce the release of carbon dioxide to atmosphere seems to be the transition from fossil fuel economy to hydrogen economy, see J. O. M. Bockris, International Journal of Hydrogen Energy, 27 (2002) 731-740.

Presently known oxygen/hydrogen fuel cells do not produce carbon dioxide when using hydrogen as fuel. However, it would be even more advantageous to provide a bio-fuel cell based on iron-oxidizing microorganisms such as *Leptospirillum* which exhibit very high efficiency and which consumes $CO_2$ from atmosphere during its operation.

A biofuel cell is disclosed in publication WO 2005/001981 A2 to Karamanev in which the reduction of the oxidant, as well as the oxidation of the fuel are carried out in a conventional fuel cell which includes an anode, a cathode and a proton-exchange membrane separating them. Ferrous ions, produced as a result of the reduction of the oxidant, are regenerated by iron-oxidizing microorganisms in a bioreactor, connected to the cathodic chamber of the biofuel cell via a pipeline. A pump, installed between the bioreactor and the cathodic chamber of the fuel cell, is used to circulate the ferrous ion solution from the fuel cell to the bioreactor, and the ferric ions from the bioreactor to the fuel cell. One embodiment of the biofuel cell suffers from several disadvantages, including the need for pumps, a larger footprint of the entire system since the fuel cell and bioreactor are separate units, and that a conventional fuel cell stack is required which is problematic when the stack needs to be serviced.

In addition, energy is required for pumping the oxidant ($Fe^{3+}/Fe^{2+}$ solution) from the bioreactor to the fuel cell, and for moving the liquid through the distribution channels of the cathode and for pumping it back to the bioreactor. At the same time, the energy spent for the pumping of air and/or oxygen to the bioreactor is not used mechanically and is wasted. The ratio of $Fe^{3+}/Fe^{2+}$ significantly decreases during the flow of the oxidant in the channels of the cathode distributor. This results in decrease of the cathode potential, which is directly proportional to the electrical efficiency of the process. This fuel cell is difficult to service since even the smallest intervention requires a complete disassembling of the entire fuel cell stack and shutting it down.

In embodiments of the biofuel cell disclosed in WO 2005/001981 A2, the microorganisms are immobilized on the surface of the cathode within the fuel cell, and are supplied with oxygen by pumping either oxygen-containing gas, or oxygen-containing liquid into the cathodic space of the fuel cell. The problems of this embodiment of the biofuel cell include blockage of the porous cathode by the growing microorganisms and the insoluble by-products of their metabolism such as jarosites; the fuel cell is difficult to service since even the smallest intervention requires a complete disassembling of the entire fuel cell stack and shutting it down; difficulties in maintaining the water balance at the cathode when oxygen is supplied by gas; oxygen solubility limitations when oxygen is supplied by liquid (the solubility of oxygen in water, in equilibrium with air, is approx. 8 mg/L; and difficult separation of the excess microbial cells from the system.

It would therefore be very, advantageous to provide a fuel cell that overcomes these limitations.

SUMMARY OF INVENTION

A goal of this invention is to provide a fuel cell bioreactor, where a fuel cell and a bioreactor for reoxidation of the intermediate oxidant are integrated in a single unit, referred to hereinafter as a "fuel cell bioreactor". The fuel cell bioreactor is based on the incorporation of a cathode and a membrane-anode assembly into the bioreactor for the oxidation of metal ions.

In one aspect of the invention there is provided a fuel cell bioreactor for producing electrical power, comprising;

a) a vessel containing metal-oxidizing microorganisms and a catholyte containing a redox couple with a first member of the redox couple in a higher oxidation state than a second member of the redox couple;

b) a cathode electrode immersed in the catholyte;

c) an anode electrode assembly including a membrane anode assembly which includes a proton conducting membrane attached to an anode electrode, the anode electrode assembly including a current collector physically contacting the anode electrode, the current collector and the anode electrode being configured to form an anode compartment therebetween, the anode electrode assembly including an insulating housing into which the current collector and the anode electrode are inserted to seal the anode electrode, and the current collector from the catholyte such that the anode electrode assembly is configured so that the anode compartment is separated from said catholyte by the proton conducting membrane;

d) a first fluid feed mechanism for feeding a fluid containing oxygen ($O_2$) and carbon dioxide into the catholyte;

e) a second fluid feed mechanism for feeding a fuel containing a hydrogen constituent into said anode compartment, wherein a reaction at the cathode electrode is reduction of the first member of the redox couple in a higher oxidation state to the second member of the redox couple in a lower oxidation state, and wherein a reaction at the anode electrode is electrochemical oxidation of the fuel to produce electrons ($e^-$) and protons ($H^+$), wherein protons ($H^+$) cross the proton conducting membrane from the anode compartment into the catholyte, and wherein the second member of the redox couple in the lower oxidation state is oxidized back to the first member of the redox couple in the higher oxidation state by metal-oxidizing microorganisms in an aerobic oxidation reaction in the presence of oxygen, wherein electrical power is obtained by making electrical connection between a load and the anode and cathode electrodes; and f) liquid circulation mechanism configured to circulate the catholyte such that the second member of the redox couple in the lower oxidation state produced at the cathode and protons ($H^+$) are transported away from the cathode electrode.

The membrane permeable to protons may be a proton exchange membrane.

The bioreactor may contain dissolved nutrients for facilitating growth of the iron-oxidizing microorganisms.

Controlling a ratio of electrical production to biomass production can be achieved by varying microbial cultivation parameters including an electrical potential of the cathode electrode, by varying the inorganic nutrient salt composition, or a combination of these.

The iron-oxidizing microorganisms may be among the *Acidithiobacillus* genus, *Leptospirillum* genus, *Ferroplasma* genus.

In another aspect of the present invention there is provided a method for generating electricity, comprising;

a) feeding a fluid containing oxygen and carbon dioxide into a catholyte contained in a cathode compartment of an integrated bioreactor and fuel cell system, said integrated bioreactor and fuel cell system having a cathode electrode in the cathode compartment and a catholyte containing therein a redox couple having a first member of the redox couple in a higher oxidation state than a second member of the redox couple, with a reaction at the cathode electrode being reduction of the first member of the redox couple to the second member of the redox couple in a lower oxidation state;

b) feeding a fuel into an anode compartment of an anode electrode assembly inserted into the cathode compartment, the anode electrode assembly including an anode electrode with the fuel having a hydrogen constituent, said anode compartment being separated from said cathode compartment by a proton conducting membrane, a reaction at the anode electrode being electrochemical oxidation of the fuel to produce electrons ($e^-$) and protons ($H^+$), wherein protons ($H^+$), formed by the oxidation of the fuel cross the proton exchange membrane into the cathode compartment;

c) oxidizing the second member of the redox couple in the lower oxidation state back to the first member in the higher oxidation state by metal-oxidizing microorganisms in the presence of oxygen wherein electrical power in an electrical load is obtained by making electrical connection between the electrical load and the anode and cathode electrodes; and d) circulating the catholyte such that the second member of the redox couple in the lower oxidation state and protons ($H^+$) are transported away from the cathode electrode.

BRIEF DESCRIPTION OF DRAWINGS

The following is a description, by way of example only, of the biofuel cell constructed in accordance with the present invention, reference being had to the accompanying drawings, in which.

DETAILED DESCRIPTION OF THE INVENTION

The systems described herein are directed, in general, to embodiments of fuel cell bioreactors. Although embodiments of the present invention are disclosed herein, the disclosed embodiments are merely exemplary and it should be understood that the invention relates to many alternative forms. Furthermore, the Figures are not drawn to scale and some features may be exaggerated or minimized to show details of particular features while related elements may have been eliminated to prevent obscuring novel aspects. Therefore, specific structural and functional details disclosed herein are not to be interpreted as limiting but merely as a basis for the claims and as a representative basis for enabling someone skilled in the art to employ the present invention in a variety of manner. For purposes of instruction and not limitation, the illustrated embodiments are all directed to embodiments of a fuel cell bioreactor.

As used herein, the term "about", when used in conjunction with ranges of dimensions of particles or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

A preferred embodiment of a fuel cell bioreactor constructed in accordance with the present invention is based on the microbial oxidation of ferrous ions for the regeneraition of the oxidant (ferric ions) in the fuel cell where the ferric iron are regenerated by iron-oxidizing microorganisms according to the reaction (1) above.

The present invention provides a fuel cell bioreactor which is a combination of a fuel cell and a bioreactor for reoxidation of the intermediate oxidant, where the fuel cell and the bioreactor for reoxidation of the intermediate oxidant are integrated in a single unit, which we refer to as a "fuel cell bioreactor". The fuel cell bioreactor is based on the incorporation of the cathode and the membrane-anode assembly in the bioreactor for the oxidation of ferrous iron. A major problem solved by the fuel cell bioreactor disclosed herein is to be able to consume $CO_2$ from the atmosphere, while at the same time providing a compact electrical power generation unit.

Figure 1:
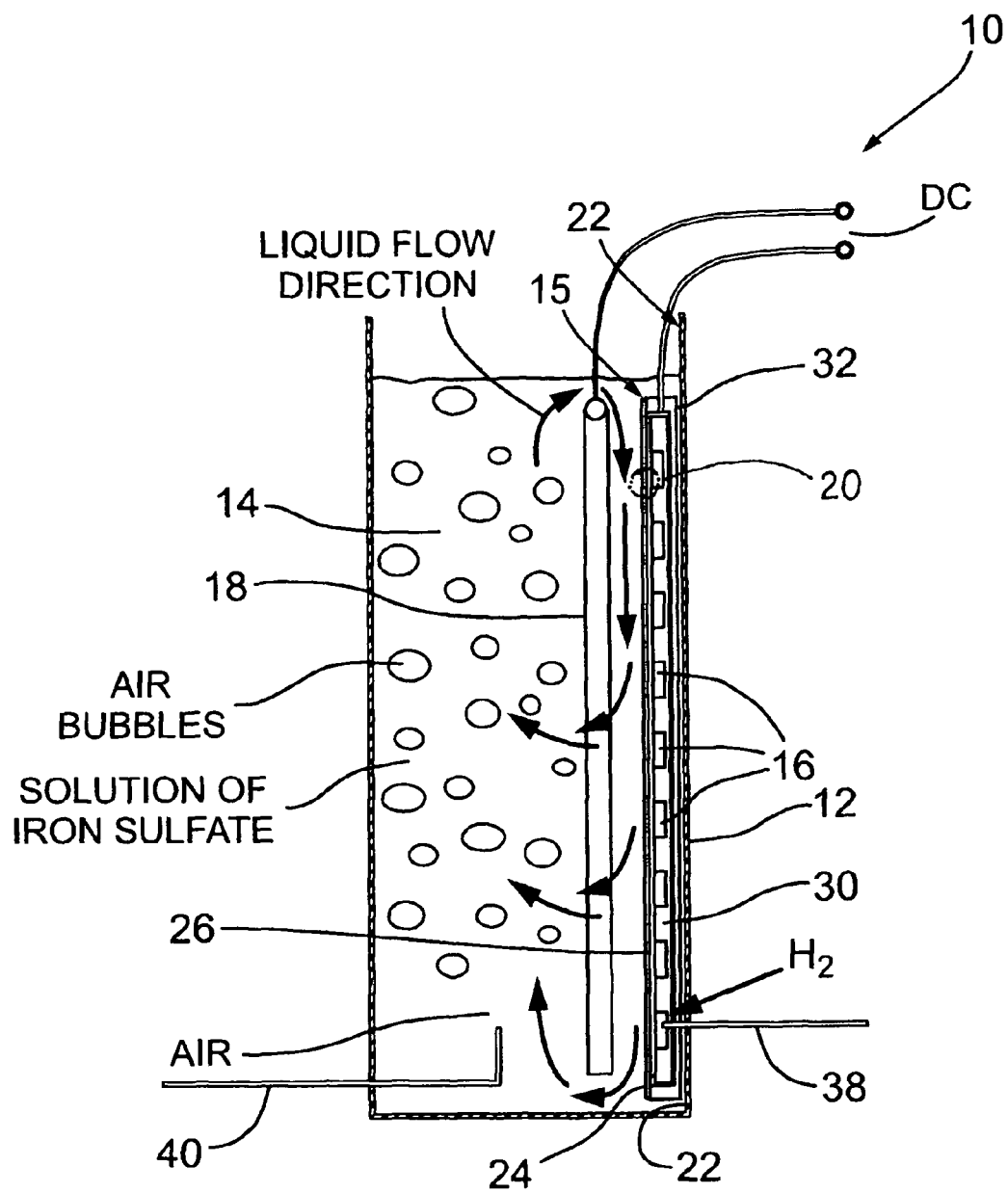
FIG. 1 shows a diagrammatic representation of a fuel cell bioreactor constructed in accordance with the present invention.
Figure 2:
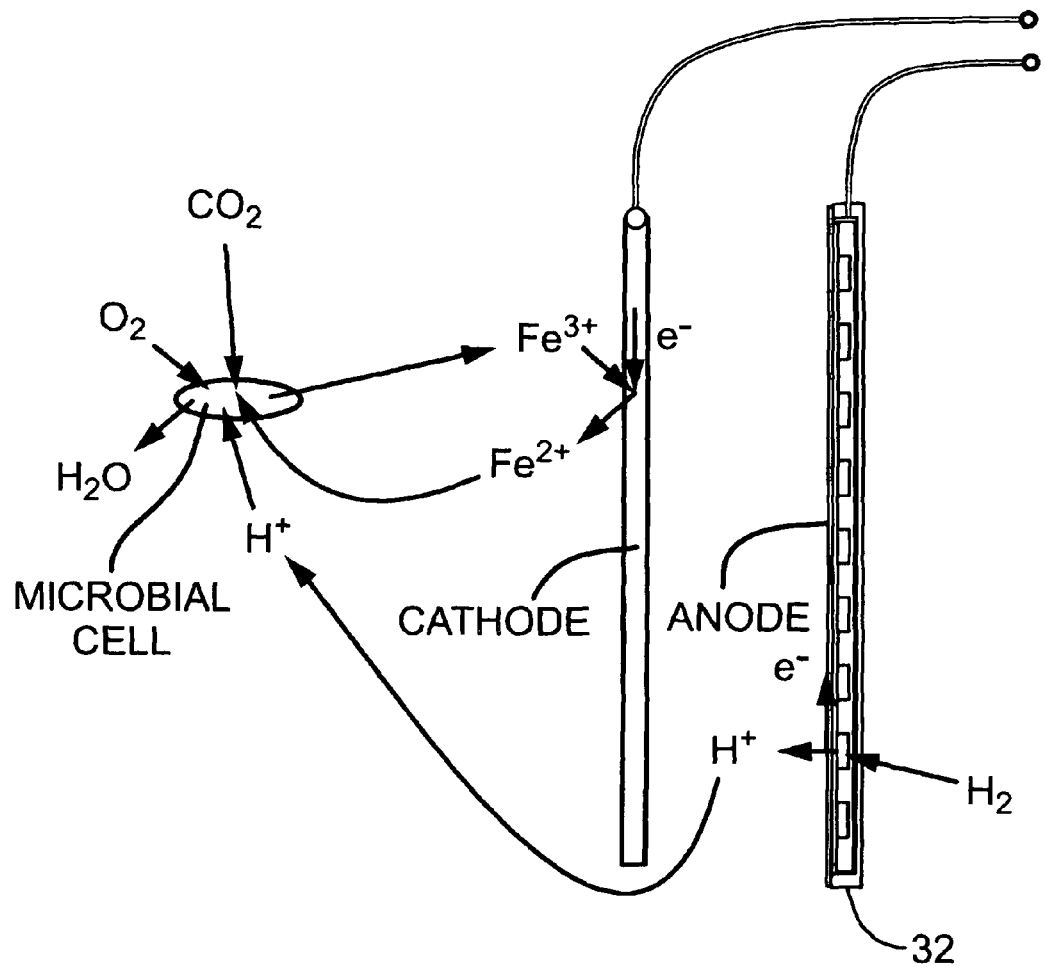
FIG. 2 shows the electrochemical and biochemical reactions taking place in the fuel cell bioreactor shown in FIG. 1.
Figure 3:
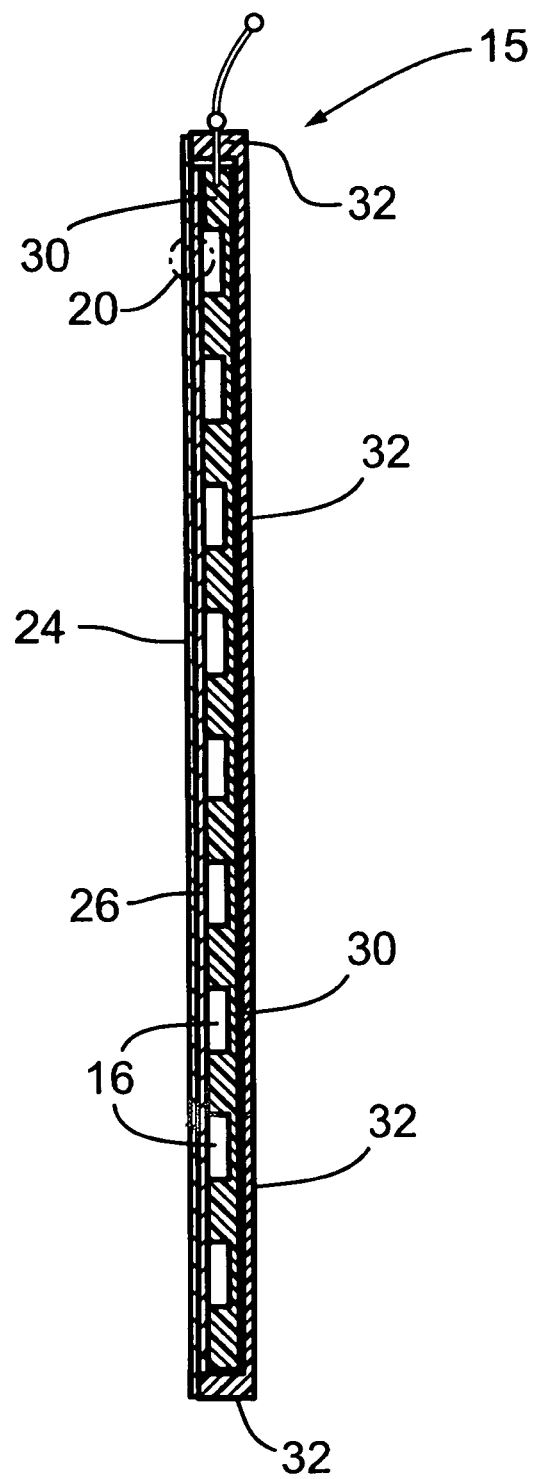
FIG. 3 is a blow-up of a portion of the fuel cell bioreactor of FIG. 1.

A fuel cell bioreactor constructed in accordance with the present invention is shown generally at 10 in FIG. 1. Bioreactor 10 includes a vessel or housing 12, containing a cathode compartment 14 and an anode electrode assembly 15 which encloses an anode compartment 16. The cathode compartment 14 contains an electrically conductive, chemically and electrochemically inert, cathode 18 which acts as a barrier in addition to being the cathode. The anode compartment 16 is contained in the anode electrode assembly 15 which includes a membrane anode assembly 20 comprised of a membrane 24 located on a planar anode electrode 26. The anode electrode assembly 15 further includes an electrically conductive distributor plate 30 (which acts as a current collector) to which the planar anode electrode 26 is mechanically (hence electrically) contacted. As shown in FIGS. 2 and 3 the distributor plate 30 has groves on its inner surface so that when anode 26 is pressed against it a series of flow channels forming the anode compartment 16 is produced. However it will be understood that the distributor plate 30 could be flat and the anode provided with the grooves would give the same result.

The anode electrode assembly 15 is located parallel to the cathode 18 between the cathode 18 and the adjacent wall 22 of housing 12. The fuel cell bioreactor is configured to provide liquid circulation to circulate the liquid such that ferrous ions ($Fe^{2+}$) and protons ($H^+$) (which are discussed hereinafter) are transported away from the cathode electrode in reactions. This circulation may be achieved in any one of several ways, including mechanical agitation of the liquid in the vessel, bubbling of the fluids being injected into the liquid (cathode compartment). It will be appreciated by those skilled in the art that circulation can be achieved in numerous ways.

More specifically, referring to FIG. 3, the membrane 24 is a proton-conductive membrane. The anode electrode 26 and the distributor plate 30 are electrically isolated from the liquid in the cathode compartment 14 of the bioreactor by a non-conductive enclosure 32. The system 10 includes a fluid (gas or liquid) feed mechanism 38 for feeding a fuel having a hydrogen constituent into the anode compartment 16 and the fluid feed mechanism may be a pump connected to a port on the side of vessel 12 or it may be fed from the top of vessel 12 into the liquid or it may be just a tank of compressed gas containing the hydrogen constituent.

The distance between the proton conducting membrane 24 and the cathode electrode 18 may be in a range from about 0 cm (in the case when cathode 18 is porous) to about 20 cm.

Membrane 24 may be for example a Nafion proton-exchange membrane. While the membrane is preferably a proton exchange membrane (PEM) other types of membranes may be used for separating physically the liquid in the cathode compartment 14 from the fluid (for example, hydrogen fuel) in the anode compartment 16. For example, the membrane 24 does not necessarily need to be a proton-exchange membrane, but may also be an inert membrane (plastic or inorganic material) with very fine pores (less than about 10 micrometers), which just separates physically the anode and cathode compartments with the pores in the membrane providing the proton conducting pathways. Non-limiting examples include nitrocellulose membranes with a pore size below about 0.2 micrometers; dialysis membranes; and reverse osmosis membranes. The membrane may also be a layer of a substantially inert fibrous material and wherein flooding of the anode is prevented by using an anode which includes a hydrophobic constituent. The membrane 24 may also be a proton-specific (also called perm-selective) membrane, which allows only the transport of protons ($H^+$), but not larger cations (such as $Fe^{2+}$ and $Fe^{3+}$). A typical example of the latter type of membrane is Selemion™, produced by Asahi Glass (Japan). The membrane 24 may be a perm-selective membrane alone or as well it may be a composite type of Nafion-Selemion membrane.

Cathode compartment 14 is aerated with a gas containing oxygen ($O_2$) and carbon dioxide ($CO_2$) and it may be air or a prepared gas mixture. The gas containing oxygen ($O_2$) and carbon dioxide ($CO_2$) may be fed into cathode compartment 14 using any kind of fluid (gas or liquid) feed mechanism 40 such as a pump connected to gas port, or it may be just a tank of compressed gas or liquid. The gas is used to supply the microorganisms with an electron acceptor (oxygen) and a carbon source ($CO_2$) via dissolution of these gases in the liquid, as well as for creating circulation of the liquid in the fuel cell bioreactor 10 so that the flow direction is preferably upwards in the aerated section 14 and downwards in the non-aerated anode compartment 16 and horizontally through the cathode 18 in those embodiments in which the cathode 18 is porous.

The cathode 18 can be either porous or non-porous. In one exemplary embodiment fuel cell bioreactor 10 is filled with an aqueous solution of iron sulfate ($FeSO_4$) and nutrient salts containing inorganic ions such as $Ca^{2+}$, $NH_{4+}$, $K^+$, $Mg^{2+}$, $SO_4^{2-}$, $NO_3^-$, $PO_4^{3-}$ and $Cl^-$.

The cathode electrode 18 may be made from a chemically inert electrically conducting material such as carbon and stainless steel. It will be understood that the cathode may contain a catalyst which may be one of several catalysts, including minute amounts of gold, platinum, lead, palladium or other catalysts known to those skilled in the art. More particularly, several types of cathodes 18 may be used in the fuel cell bioreactor 10, including solid carbon plate, which can be pure or a composite, containing additives such as gold, platinum, carbon black or activated carbon particles on its surface. Another type of cathode material includes a fibrous cathode material which may be either a non-woven (felt) or woven carbon textile. The fibres of the textile can be made of carbon, graphite, activated carbon or their combination. They can be either bare or containing additives such as gold, platinum, activated carbon powder, carbon black. For example, gold can be applied to the surface of the electrode by sputtering in order to obtain a gold layer with a thickness between up to about 300 Angstrom. Another material from which the cathodes may be produced includes porous, sponge-type, rigid carbon foam which may be made from carbon, graphite or glassy carbon.

Composite carbon-based cathodes may also be made by attaching carbon powder or fibres, made of activated carbon, graphite, graphitized activated carbon or their mixture, on a conductive support, such as stainless-steel mesh. In a modification of this, a cathode may be made from two layers of carbon fibres or powder attached to a conductive mesh with the lower layer containing a hydrophobic material such as teflon and carbon black, while the upper layer is made from a material which is hydrophilic. The cathode may be a composite material, formed on the surface of the proton-exchange membrane from one or more of the materials described above. In that case, the aerated and the non-aerated sections of the bioreactor may be separated by an inert wall non-permeable to fluids.

When the cathode 18 is made of a soft material (carbon felt or textile), current collection is achieved by the soft material being sandwiched between two conductive meshes or perforated plates, which are made of metal (such as stainless steel) or carbon which provide mechanical support to the felt and also act as current collectors. In the case of the cathode being made of a composite material, the current is collected from the conductive support material. In the case of composite cathode formed on the surface of the proton-exchange membrane, the current is collected by pressing a porous, conductive plate, similar to that used with the soft cathode material, against the membrane-electrode assembly.

The anode 26 may be platinized carbon in a preferred embodiment. Other compounds may be used in addition to platinized carbon including other metals of the platinum group, as well as their mixtures.

The anode may also include non-platinum anodic catalysts such as tungsten carbide and other substances containing transition metals of the platinum group, as well as their mixtures. In addition to tungsten carbide, iron phosphide, and cobalt phosphide may also be used as catalysts to mention just a few.

A preferred iron-oxidizing microorganism for use in the fuel cell bioreactor disclosed herein is of the *Leptospirillum* genus including for example *Leptospirillum ferrooxidans*, *Leptospirillum ferriphilum* and *Leptospirillum ferrodiazotrophum*. It will be understood that other microorganisms may be used, for example members of the *Acidithiobacillus* genus; *Ferroplasma* genus, *Acidimicrobium*, *Alicyclobacillus* and *Sulfobacillus* which are known to those skilled in the art, to mention just a few.

These microorganisms work in substantially the same way as *Acidithiobacillus ferroxidans* which may also be used. Other microorganisms which work in the same way are known to those skilled in the art and are contemplated by the inventor to be useful in the present invention.

The present invention also may use microbial mixtures of autotrophic organisms (such as *Leptospirillum*) with mixotrophic microorganisms (such as *Ferroplasma*). In this case, the organic by-products, formed during the iron oxidation by the autotrophs, will be consumed by the heterotrophs. This is advantageous because the accumulation of organics can harm the autotrophs.

In a preferred embodiment the ferrous ions ($Fe^{2+}$) are present in a concentration between 0.1 g/L and the limit of solubility and protons ($H^+$) are present in a concentration to give a pH between minus 1 and +4. The distance between the anode electrode and the cathode electrode is in a range from greater than 0 to about 20 cm.

In one embodiment of the fuel cell bioreactor the cathode 18 may be porous and may be attached to the proton conducting membrane 24. As shown in FIGS. 1 to 3 anode electrode assembly 15 is planar and in this embodiment the anode electrode 26 is pressed against the current collector 30 by either applying pressure to the membrane 24 from the side of the cathode compartment, or by using a mesh (grid) against the outer surface of the membrane 24 on the opposite side as the anode 26.

The anode electrode assembly 15 may be also cylindrical (or part of a cylindrical surface), which will improve the contact between the anode electrode 26 and the current collector 30.

Further, a single cathode compartment 14 may contain more than one anode electrode assembly 15. The iron-oxidizing microorganisms may be free floating or freely suspended in the liquid in the vessel 12 or they may be immobilized on cathode electrode 18 which may contain a substantially chemically inert material, which facilitates microbial immobilization. The chemically inert material may be silicon dioxide powder or gel, aluminum oxide (alumina), jarosite or calcium sulfate, to mention just a few examples.

The microorganisms may be immobilized on inert support particles, placed in the vessel 12. The fuel cell bioreactor may include means for fluidizing the inert support particles which may be either upflow fluidization of the inert support particles or inverse fluidization of the inert support particles. The support particles may be either solid or porous with a size between 0.01 mm and 50 mm. The microorganisms may also be immobilized on a surface of an inert wall, which can be either porous (fibrous) or solid and inserted into the cathode compartment 14 of the vessel 12.

The present invention discloses the integration of a bioreactor and a fuel cell. The types of bioreactors in which the components required to make it function both as a bioreactor and fuel cell, specifically the cathode 18 and membrane anode assembly (MM) 20, can be inserted include those disclosed in D. G. Karamanev, C. Chavarie, R. Samson, Biotechnology and Bioengineering, 57 (1998) 471-476 which discloses a design combining an airlift system and a fibrous immobilized microbial cell support. In some embodiments, a inverse fluidized bed biofilm reactor may be used as disclosed in D. G. Karamanev, L. N. Nikolov, Environmental Progress, 15 (1996) 194-196. Other types of bioreactors such as mechanically agitated bioreactors with axial or radial flow impellers, bubble columns, external or internal circulation airlifts, fixed bed or fluidized bed immobilized-cell bioreactors can be used as well.

The electrochemical and biochemical reactions taking place in the fuel cell bioreactor are shown in FIG. 2. Ferric iron from the aqueous solution in the bioreactor are transformed into ferrous ions on the surface of the cathode, consuming electrons according to the cathodic reaction:

$$Fe^{3+}+e^-=Fe^{2+} \tag{6}$$

The ferrous ions are then transported with the circulating solution to the microbial cells, where they are reoxidized according to the following net biochemical reaction:

$$Fe^{2+}+H^++\tfrac{1}{4}O_2=Fe^{3+}+\tfrac{1}{2}H_2O \tag{7}$$

The reaction taking place on the anode is the oxidation of hydrogen:

$$H_2=H^++e^- \tag{8}$$

or oxidation of another fuel such as methanol. The protons produced in reaction (8) are then consumed by the microbial cells (reaction 2). In addition, microbial cells consume carbon dioxide as a carbon source.

The overall reaction (chemical plus biochemical) taking place in the biofuel cell 10, can be obtained by summing the reactions 6, 7 and 8 which gives:

$$2H_2+O_2=2H_2O \tag{9}$$

Therefore, the overall reaction in the biofuel cell 10 is the same as that in a hydrogen-oxygen fuel cell. The microorganisms plus the iron ions simply act as biocatalyst, which greatly increases the rate of the cathodic reaction. The ratio between the amount of energy used for electricity production and the amount of energy used for microbial growth can be easily controlled by varying cultivation conditions such as the ferric-to-ferrous iron concentration ratio in the bioreactor effluent. It is even possible to bring this ratio to infinity by uncoupling the microbial growth from ferrous iron oxidation. In that case no $CO_2$ is consumed and no biomass is produced.

Other fuels having a hydrogen constituent besides hydrogen gas and methanol may include ethanol, ammonia and hydrazine.

The present fuel cell bioreactor 10 disclosed herein is very advantageous for several reasons. A small amount of energy consumed due to the absence of liquid pumps, used for recirculation of the catholyte in previous fuel cells, a high cathode potential may be used because of the direct contact of the cathode with ferric ions, produced by the microorganisms, and also due to the high liquid recirculation rate. The design of present fuel cell bioreactor 10 also allows for very easy, non-intrusive servicing of the anode electrode assemblies 15 and the cathodes 18. This is due to the fact that both the anode and the cathode may be freely inserted in the bioreactor and can be easily withdrawn for servicing. In addition, the microorganisms may spontaneously grow and become immobilized on the surface of the cathode 18 which will act to additionally increase the cathodic potential by directly supplying the cathode with ferric ions.

While the present invention has been illustrated using the redox couple $Fe^{2+}/Fe^{3+}$ and iron-oxidizing microorganisms, it will be appreciated by those skilled in the art that other redox couples may be used and metal-oxidizing microorganisms other than those disclosed herein that may be more efficient at oxidizing the member of the redox couple in the lower oxidation state back to the first member of the redox couple in the higher oxidation state. Non-limiting examples of other redox couples include $Cu^+/Cu^{2+}$; $Mo^{5+}/Mo^{6+}$ as non-limiting examples which can be oxidized by the same microorganisms that can oxidize iron disclosed herein.

The following non-limiting examples serve only to illustrate the invention and not limit the invention to these particular embodiments.

Example

The fuel cell bioreactor 10 was tested under different operating conditions. A rectangular, pressurized housing 12 with a height of 60 cm, width of 20 cm and depth of 4 cm was made of transparent acrylic. The wall thickness was 2 cm. The membrane-anode assembly was a Nafion membrane 24 with an anode electrode 26, attached on one of its sides. The anode electrode 26 was a standard carbon-base composite, used as a hydrogen anode, with a platinum content of 0.4 mg/cm². The anode flow distributor plate 30 was a rectangular, 13×13 cm, carbon composite plate with a thickness of 1.5 cm. The flow distribution channels had a serpentine shape and were 2 mm wide and 2.5 mm deep, with spacing between them of 2 mm. They occupied an area of 10×10 cm. The current was collected by a copper foil, attached to the back of the distributor plate 30, and was brought outside of the bioreactor by insulated copper wire. The enclosure 32 of the anode electrode assembly 15 was made of plexiglass and was sealed by epoxy glue. The wall separating the aerated (riser) and non-aerated (downer) sections of the bioreactor was made of 1 mm thick plexiglass sheet. In the lower part of it, a 10×10 cm window was cut. Its position was chosen so that it faced the membrane-anode assembly. The cathode 18, made of activated carbon felt, was a 10×10 cm rectangle, and was installed in the window of the separating wall. It was supported at each size by two pieces of stainless steel mesh (80% opening), which also were used as current collectors. The riser was aerated with air, using a perforated rubber distributor. The bioreactor 10 was kept under pressure, at 1.5 atm (abs.) in order to assure a contact between the anode electrode 26 and its flow distributing plate 30.

The bioreactor was filled with aqueous iron sulfate solution (13.5 gFe/L), containing nutrient salts (9K medium of Silverman and Lundgren) and microbial culture of iron-oxidizing microorganisms. After supplying the anode space with hydrogen, the fuel, cell bioreactor produced 2.5 Å of electrical current with a voltage of 274 mV. Thus, this is the first ever report of a bioreactor, which produces electricity as the only product of microbial action.

Since the cathodic reaction (6) on a carbon electrode is much faster than oxygen reduction on a platinum electrode, and since the oxygen reduction rate is the limiting factor in the currently used fuel cells, the fuel cell disclosed herein will drastically improve both the economy and environmental effect of fuel cell operation due to the 1) increase in the current efficiency; 2) elimination of the use of Pt at the cathode; 3) lower cost of current fuel cells; 4) removal of carbon dioxide from atmosphere; and 5) production of potentially highly useful biomass in the form of single cell protein.

It has already been shown that *A. ferrooxidans* contains 44% protein, 26% lipids, 15% carbohydrates and at least two B-vitamins, see Tributsch, H, *Nature,* 281, 555 (1979). No negative physiological effect of this type of biomass are known, see Tributsch, H, *Nature,* 281, 555 (1979), but obviously, more research in this direction is needed.

It will be understood that the present invention is not restricted to only gaseous hydrogen/oxygen fuel cells using gaseous hydrogen fuel but may use other hydrogen containing fuels which can undergo electrochemical oxidation, for example methanol, ethanol to mention just a few. For example, the anodic reaction in the case of methanol fuel is:

$$CH_3OH+H_2O=CO_2+6H^++6e^-$$

The hydrogen ions again cross the membrane, and the rest of the fuel cell, as well as the biofuel cell system is the same as in the case of biofuel cell using gaseous $H_2$ fuel.

In the case of ethanol as a fuel, the anodic reaction is:

$$C_2H_5OH+3H_2O=2CO_2+12H^++12e-$$

Thus in alternative embodiments of the biofuel cell, the fuel may be a compound having a hydrogen constituent (either the only constituent in the case of hydrogen gas or one of several constituents in the case of a compound) and electrochemical oxidation of the fuel produces protons and electrons as with the oxidation of hydrogen but may include other products as well, and the fuel is pumped into the anode compartment in a fluid which may be in the form of a gas or liquid.

The fuel cell bioreactor may be configured with many different variations or alternative embodiments as listed below.

A. For free suspended microbial culture:
1) airlift bioreactor, as shown in FIG. 1;
2) mechanically-agitated bioreactor;
3) bubble-column bioreactor (similar to the airlift, but without vertical wall);
4) liquid-jet aerated bioreactor.

B. For immobilized microbial culture:
1) inverse fluidized bed bioreactor;
2) upflow fluidized bed bioreactor;
3) fixed bed bioreactor;
4) airlift bioreactor with a porous wall, used for immobilization of microorganisms;
5) rotating disk or drum bioreactor.

The microorganisms are iron-oxidizers, which can be represented by one or more of the following types of microorganisms: *Leptospirillum, Acidithiobacillus, Ferroplasma.* The gas phase, fed to the bioreactor, can be air or a mixture of oxygen and $CO_2$.

There are several advantages of the fuel cell bioreactor disclosed herein and the biofuel cell disclosed in publication WO 2005/001981 A2. For example the present fuel cell bioreactor integrates the bioreactor and the fuel cell into the same space thus reducing the footprint of the entire system making it more compact. In the present fuel cell bioreactor the anode electrode assembly 15 containing the anode compartments 16 is inserted in the cathodic compartment which is the interior of vessel 12, and surrounded by the catholyte (solution of iron sulfphate). This advantageously eliminates the need for pumping of the biologically produced ferrous ions between the bioreactor and the fuel cell, and also facilitates achieving a higher cell voltage and therefore, cell efficiency. Since the individual cells are not mechanically attached to each other this eliminates the need to make a fuel cell stack which in turn allows for more efficient servicing of the fuel cell.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A fuel cell bioreactor for producing electrical power, comprising;
   a) a vessel containing metal ion-oxidizing microorganisms and a catholyte, the catholyte containing a redox couple with a first member of the redox couple in a higher oxidation state than a second member of the redox couple;
   b) a cathode electrode immersed in the catholyte in the vessel;
   c) an anode electrode assembly immersed in the catholyte in the vessel, the anode assembly including a membrane anode assembly which includes a proton conducting membrane attached to an anode electrode, the anode electrode assembly including a current collector physically contacting the anode electrode, the current collector and the anode electrode being configured to form an anode compartment therebetween, the anode electrode assembly including an insulating housing into which the current collector and the anode electrode are inserted to seal the anode electrode and the current collector from the catholyte such that the anode electrode assembly is configured so that the anode compartment is separated from said catholyte by the proton conducting membrane;
   d) a first fluid feed mechanism for feeding a fluid containing oxygen ($O_2$) and carbon dioxide into the catholyte;
   e) a second fluid feed mechanism for feeding a fuel containing a hydrogen constituent into said anode compartment, wherein a reaction at the cathode electrode is reduction of the first member of the redox couple in a higher oxidation state to the second member of the redox couple in a lower oxidation state, and wherein a reaction at the anode electrode is electrochemical oxidation of the fuel to produce electrons ($e^-$) and protons ($H^+$), wherein protons ($H^+$) cross the proton conducting membrane from the anode compartment into the catholyte, and wherein the second member of the redox couple in the lower oxidation state is oxidized back to the first member of the redox couple in the higher oxidation state by metal ion-oxidizing microorganisms in an aerobic oxidation reaction in the presence of oxygen, wherein electrical power is obtained by making electrical connection between a load and the anode and cathode electrodes; and
   f) liquid circulation mechanism configured to circulate the catholyte such that the second member of the redox couple in the lower oxidation state produced at the cathode and protons ($H^+$) are transported away from the cathode electrode.

2. The fuel cell bioreactor according to claim 1 wherein the redox couple is one of $Cu^+/Cu^{2+}$ and $Mo^{5+}/Mo^{6+}$.

3. The fuel cell bioreactor according to claim 1 wherein the redox couple is $Fe^{2+}/Fe^{3+}$ and the metal ion-oxidizing microorganisms are iron-oxidizing microorganisms, and wherein the reaction at the cathode electrode is reduction of ferric ions ($Fe^{3+}$) in a reaction given by $4Fe^{3+}+4e^-=4Fe^{2+}$, and wherein ferrous ions ($Fe^{2+}$) are oxidized by the iron-oxidizing microorganisms to ferric ions ($Fe^{3+}$) in an aerobic oxidation reaction given by $4Fe^{2+}+4H^++O_2=4Fe^{3+}+2H_2O$.

4. The fuel cell bioreactor according to claim 1, wherein the metal-oxidizing microorganisms are selected from the group consisting of *Acidithiobacillus* genus such as but not limited to *Acidithiobacillus ferrooxidans* and *Leptospirillum* genus such as but not limited to *Leptospirillum ferrooxidans, Leptospirillum ferriphilum, Leptospirillum ferrodiazotrophum; Ferroplasma* genus, *Acidimicrobium, Alicyclobacillus*, and *Sulfobacillus* and mixtures thereof.

5. The fuel cell bioreactor according to claim 1, wherein the metal-oxidizing microorganisms include microbial mixtures of autotrophic organisms such as but not limited to *Leptospirillum* with mixotrophic microorganisms such as but not limited to *Ferroplasma*.

6. The fuel cell bioreactor according to claim 5 wherein autotrophic organisms are *Leptospirillum*, and the mixotrophic microorganisms are *Ferroplasma*.

7. The fuel cell bioreactor according to claim 1, wherein the proton conducting membrane is a proton exchange membrane.

8. The fuel cell bioreactor according to claim 1, wherein the proton conducting membrane is substantially non-permeable to ions having a higher-molecular weight than protons ($H^+$).

9. The fuel cell bioreactor according to claim 1, wherein the proton conducting membrane is made of a substantially inert material having pores extending therethrough with pores having a size selected to inhibit catholyte flow through and in the membrane.

10. The fuel cell bioreactor according to claim 1, wherein the proton conducting membrane is made of a substantially inert fibrous material, and wherein the anode includes a hydrophobic constituent.

11. The fuel cell bioreactor according to claim 1, wherein the catholyte includes dissolved nutrients for facilitating growth of the metal ion-oxidizing microorganisms.

12. The fuel cell bioreactor according to claim 11 wherein the dissolved nutrients include one or more of the ions $NH_4^+$, $K^+$, $Mg^{2+}$ $Ca^{2+}$, $SO_4^{2-}$, $NO_3^-$, $PO_4^{3-}$ and $Cl^-$.

13. The fuel cell bioreactor according to claim 1, wherein the fuel having a hydrogen constituent is hydrogen gas ($H_2$), and wherein the electrochemical oxidation reaction is oxidation of hydrogen at the anode electrode in a reaction given by $2H_2=4H^++4e^-$, so that an overall bio-fuel cell reaction is given by $2H_2+O_2=2H_2O$.

14. The fuel cell bioreactor according to claim 1 wherein the fuel having a hydrogen constituent is selected from the group consisting of hydrogen gas, methanol, ethanol, ammonia and hydrazine.

15. The fuel cell bioreactor according to claim 1, wherein the anode electrode is selected from the group consisting of platinized carbon, and other metals of the platinum group, and mixtures thereof.

16. The fuel cell bioreactor according to claim 1, wherein the anode electrode is made from a non-platinum catalyst, represented by a transition metal compound.

17. The fuel cell bioreactor according to claim 16 wherein the transition metal compound is selected from the group consisting of tungsten carbide, iron phosphide, cobalt phosphide.

18. The fuel cell bioreactor according to claim 1, wherein the cathode electrode includes a layer of a porous material selected from the group consisting of activated carbon, glassy carbon, graphite and carbon black, and stainless steel.

19. The fuel cell bioreactor according to claim 18 wherein said porous material has a structure and composition which is any one of:
  woven carbon-based fibrous material made of graphite or activated carbon,
  non-woven fibrous material made of carbon, graphite or activated carbon fibres,
  sponge-type materials made of graphite, activated carbon or glassy carbon, and
  composite carbon-based material powder or fibres, made of carbon, activated carbon, graphite, graphitized activated carbon or mixtures thereof attached on a conductive support.

20. The fuel cell bioreactor according to claim 19 wherein said conductive support is a stainless-steel mesh.

21. The fuel cell bioreactor according to claim 1 wherein the cathode electrode includes additives selected from the group consisting of lead, gold, platinum, activated carbon powder, carbon black, and palladium.

22. The fuel cell bioreactor according to claim 1 wherein the fluid containing oxygen ($O_2$) fed into the bioreactor includes carbon dioxide ($CO_2$) for production of biomass.

23. The fuel cell bioreactor according to claim 22 including a reagent control mechanism for controlling a ratio of nutrient salts in order to control a ratio of electrical production to biomass production.

24. The fuel cell bioreactor according to claim 11 including reagent control means for controlling concentrations of the dissolved nutrients concentrations for varying microbial cultivation parameters in order to control a ratio of electrical production to biomass production.

25. The fuel cell bioreactor according to claim 1 where the microorganisms are freely suspended in the liquid.

26. The fuel cell bioreactor according to claim 1 wherein the microorganisms are immobilized on inert support particles placed in the vessel.

27. The fuel cell bioreactor according to claim 26 wherein the inert support particles are fixed in space and not moving in the vessel.

28. The fuel cell bioreactor according to claim 1 wherein the microorganisms are immobilized on inert support particles, including means for fluidizing the inert support particles.

29. The fuel cell bioreactor according to claim 28 wherein the means for fluidizing the inert support particles includes one of a means for producing upflow fluidization of the inert support particles and a means for producing inverse fluidization of the inert support particles.

30. The fuel cell bioreactor according to claim 27 wherein said inert support are support particles either solid or porous with a size between 0.01 mm and 50 mm.

31. The fuel cell bioreactor according to claim 1 wherein the microorganisms are immobilized on a surface of an inert wall, which can be either porous (fibrous) or solid located in said vessel.

32. The fuel cell bioreactor according to claim 1 wherein a distance between the proton conducting membrane and the cathode electrode is in a range from greater than 0 to about 20 cm.

33. A method for generating electricity, comprising;
  a) providing an integrated bioreactor and fuel cell system comprising:
    i) a vessel containing metal ion-oxidizing microorganisms and a catholyte;
    ii) a cathode electrode immersed in the catholyte in the vessel; and
    iii) an anode electrode assembly immersed in the catholyte in the vessel,
  b) feeding a fluid containing oxygen and carbon dioxide into the catholyte contained in the vessel of the integrated bioreactor and fuel cell system, the catholyte containing a redox couple having a first member of the redox couple in a higher oxidation state than a second member of the redox couple, with a reaction at the cathode electrode being reduction of the first member of the redox couple to the second member of the redox couple in a lower oxidation state;
  c) feeding a fuel into an anode compartment of the anode electrode assembly immersed in the catholyte in the vessel, the anode electrode assembly including an anode electrode with the fuel having a hydrogen constituent, said anode compartment being separated from said catholyte by a proton conducting membrane, a reaction at the anode electrode being electrochemical oxidation of the fuel to produce electrons ($e^-$) and protons ($H^+$), wherein protons ($H^+$), formed by the oxidation of the fuel cross the proton exchange membrane into the catholyte;
  d) oxidizing the second member of the redox couple in the lower oxidation state back to the first member in the higher oxidation state by the metal ion-oxidizing microorganisms in the presence of oxygen wherein electrical power in an electrical load is obtained by making electrical connection between the electrical load and the anode and cathode electrodes; and
  e) circulating the catholyte such that the second member of the redox couple in the lower oxidation state and protons ($H^+$) are transported away from the cathode electrode.

34. The method according to claim 33 wherein the redox couple is $Fe^{2+}/Fe^{3+}$, and the wherein the reaction at the cathode electrode is reduction of ferric ions at the cathode electrode in a reaction given by $4Fe^{3+}+4e^-=4Fe^{2+}$, and wherein the metal ion-oxidizing microorganisms are iron-oxidizing microorganisms, and wherein air or oxygen ($O_2$) is pumped into the catholyte so that the catholyte containing ferrous ions ($Fe^{2+}$) and protons ($H^+$) is circulated from the cathode electrode to the rest of the vessel where the ferrous ions ($Fe^{2+}$) are oxidized by the iron-oxidizing microorganisms to ferric ions ($Fe^{3+}$) in an aerobic oxidation reaction given by $4Fe^{2+}+4H^++O_2=4Fe^{3+}+2H_2O$.

35. The method according to claim 33 wherein the redox couple is one of $Cu^+/Cu^{2+}$ and $Mo^{5+}/Mo^{6+}$.

36. The method according to claim 33, wherein the catholyte contains dissolved nutrients for facilitating growth of the metal ion-oxidizing microorganisms.

37. The method according to claim 36 wherein the dissolved nutrient salts include one or more of the ions $NH_4^+$, $K^+$, $Mg^{2+}$ $Ca^{2+}$, $SO_4^{2-}$, $NO_3^-$, $PO_4^{3-}$ and $Cl^-$.

38. The method according to claim 37 including reagent control means for controlling concentrations of the dissolved nutrient salt concentrations for varying microbial cultivation parameters in order to control a ratio of electrical production to biomass production.

39. The method according to claim 33, including controlling a voltage on the cathode electrode for controlling a ratio of electrical production to biomass production by varying microbial cultivation parameters.

40. The method according to claim 33 wherein the metal ion-oxidizing microorganisms are *Acidithiobacillus ferroxidans*.

41. The method according to claim 33 wherein the metal ion-oxidizing microorganisms are selected from the group consisting of *Leptospirillum* species such as *Leptospirillum ferrooxidans, Leptospirillum fernphilum, Leptospirillum ferrodiazotrophum; Ferroplasma, Acidimicrobium, Alicyclobacillus*, and *Sulfobacillus* or their mixture.

42. The method according to claim 33 wherein the fuel having a hydrogen constituent is selected from the group consisting of hydrogen gas, methanol, ethanol, ammonia and hydrazine.

43. The method according to claim 33 wherein the fuel having a hydrogen constituent is hydrogen gas, and wherein the electrochemical oxidation reaction is oxidation of hydrogen at the anode electrode in a reaction given by $2H_2 = 4H+ + 4e-$, so that an overall bio-fuel cell reaction is given by $2H_2 + O_2 = 2H_2O$.

44. The method according to claim 33 wherein a distance between the proton conducting membrane and the cathode electrode is in a range from greater than 0 to about 20 cm.

\* \* \* \* \*

UNITED STATES PATENT AND TRADEMARK OFFICE
CERTIFICATE OF CORRECTION

PATENT NO. : 8,450,015 B2
APPLICATION NO. : 12/087009
DATED : May 28, 2013
INVENTOR(S) : Dimitre Karamanev, Vassili Porfirievich Glibin and Peter Vassilev Dobreff It is certified that error appears in the above-identified patent and that said Letters Patent is hereby corrected as shown below:

In the Claims:
Col. 14, Lines 51-56 should correctly read as follows:

13. The fuel cell bioreactor according to claim 1, wherein the fuel having a hydrogen constituent is hydrogen gas (H2), and wherein the electrochemical oxidation reaction is oxidation of hydrogen at the anode electrode in a reaction given by $2H_2=4H^++4e^-$, so that an overall bio-fuel cell reaction is given by $2H_2+O_2=2H_2O$.

Col. 17, Lines 6-11 should correctly read as follows:

41. The method according to claim 33 wherein the metal ion-oxidizing microorganisms are selected from the group consisting of *Leptospirillum* species such as *Leptospirillum ferrooxidans*, *Leptospirillum ferriphilum*, *Leptospirillum ferrodiazotrophum; Ferroplasma, Acidimicrobium, Alicyclobacillus*, and *Sulfobacillus* or their mixture.

Signed and Sealed this
Twenty-second Day of October, 2013

Teresa Stanek Rea
*Deputy Director of the United States Patent and Trademark Office*